Aug. 11, 1931.  J. M. CHRISTMAN  1,818,042
LATHE
Filed Nov. 28, 1928

Inventor
JOHN M. CHRISTMAN.
By Mellon-Tilletts
Attorney

Patented Aug. 11, 1931

1,818,042

UNITED STATES PATENT OFFICE

JOHN M. CHRISTMAN, OF DETROIT, MICHIGAN, ASSIGNOR TO PACKARD MOTOR CAR COMPANY, OF DETROIT, MICHIGAN, A CORPORATION OF MICHIGAN

LATHE

Application filed November 28, 1928. Serial No. 322,333.

This invention relates to lathes and more particularly to arbors for supporting work pieces.

Heretofore arbors, adaptable for supporting bored work pieces, have been provided with various instrumentalities for engaging or gripping the wall defining the bore in the work piece. Generally, the engaging or gripping means damage the wall by biting into the face thereof, and in many instances the wall is damaged by a slipping engagement of the gripping means. It is the aim of the present invention to overcome these objections.

An object of the invention is to provide a hydraulic arbor.

Another object of the invention is to provide an arbor having an expansible means for concentrically supporting bored work pieces.

Another object of the invention is to provide an arbor having an expansible retaining member and means for expanding the retaining member hydraulically.

Another object of the invention is to provide an arbor having an expansible retaining member upon one end and a compression member upon the other end for hydraulically expanding the retaining member.

A still further object of the invention is to provide an arbor having means providing a positive engagement with the wall defining a bore in a work piece, an arbor which is highly efficient in operation and yet of marked simplicity as a whole and in respect to each of its component parts, so that its manufacture is economically facilitated both as regards parts and their assembly.

Other objects of the invention will appear from the following description taken in connection with the drawings, which form a part of this specification, and in which.

Figure 1:
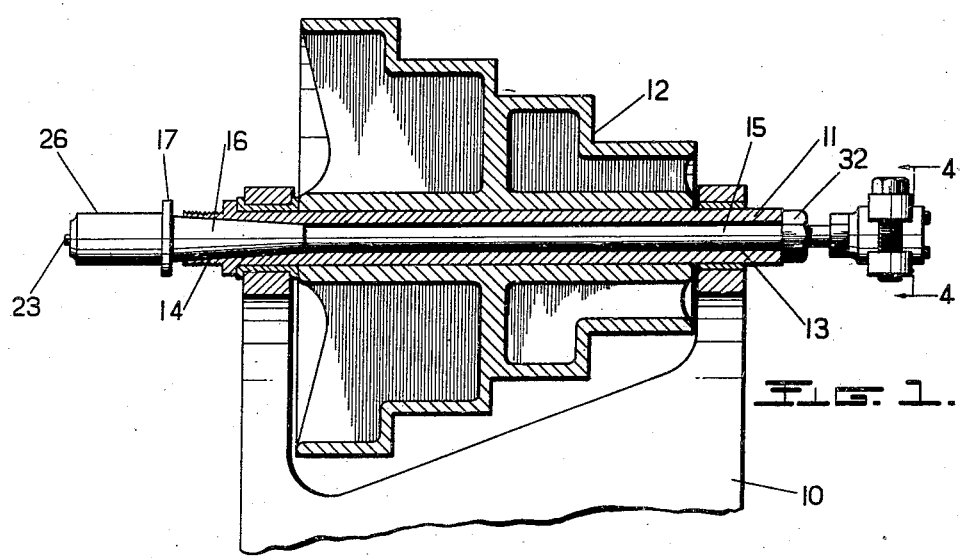
Fig. 1 is a side elevation of the head stock of a lathe, partly broken away, embodying the invention.
Figure 2:
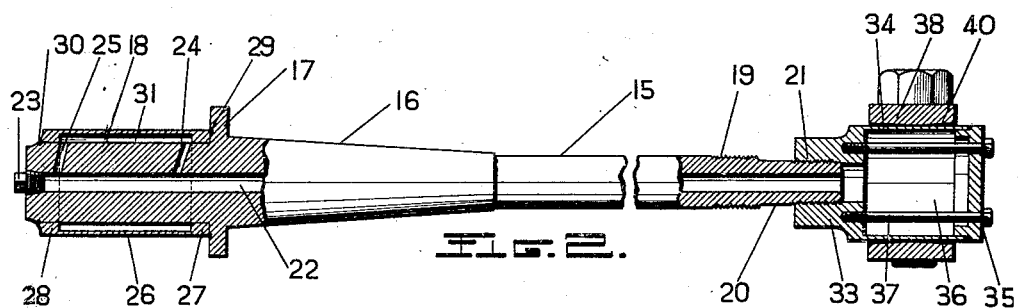
Fig. 2 is a side elevation of the arbor partly in section.

Referring to the drawings for more specific details of the invention, 10 represents the head stock of a lathe, supporting a spindle 11, adapted to be operated by a step pulley 12. As shown the spindle 11 has an axial bore 13, reamed as indicated at 14, and an arbor is supported in the bore.

The arbor comprises a cylindrical shaft 15 provided upon one end with a conical portion 16, a circumferential flange 17, and an enlarged cylindrical portion 18. The other end of the shaft is threaded, as indicated at 19, and provided with a reduced portion 20, threaded as at 21. The shaft is axially bored, as at 22, and threaded into the bore, in the enlarged end of the shaft, is a plug 23. The enlarged portion 18 has a radial bore 24 and a radial bore 25. These bores are arranged adjacent the respective ends of the enlarged portion and extend from the periphery thereof to the axial bore 22 and are inclined toward the free end of the enlarged portion, the object of which will hereinafter appear.

A sleeve 26 is fitted on the enlarged portion. This sleeve has a relatively thin wall adapted to flex when subjected to pressure. As shown, the sleeve has upon the respective ends thereof inturned flanges 27 and 28, which fit snugly on the enlarged portion with the flange 27 abutting the circumferential flange 17 at one end of the enlarged portion, and the flange 28 is positioned at the opposite end thereof.

The flanges 27 and 28 are butt welded to the circumferential flange 17 and to the enlarged portion 18, as indicated at 29 and 30. These flanges support the sleeve in spaced relation to the enlarged portion 18, so that a chamber 31 is provided between the sleeve and the periphery of the enlarged portion.

This chamber communicates with the axial bore 22 through the radial bores 24 and 25, and these bores are positioned to provide a suitable vent for the chamber as well as communicating passages between the chamber and the bore 22.

As shown, the shaft 15 is positioned in the bore 13 of the spindle 11, with the conical portion 16 on the shaft seated in the reamed portion 14 in the bore, and the shaft is secured in this position by a nut 32 on the threaded portion 19. Positioned on the threaded end 21 is a sleeve 33, provided with an integral, hollow, cylindrical, flexible portion 34, butt welded to a plate 35 to provide a chamber 36, and the plate is secured to the sleeve by a plurality of bolts 37 which maintain the plate and sleeve in fixed relation.

Positioned on the wall 34 is a compression member or clamp 38. As shown, the member 38 is provided with an opening or bore 39, and the wall defining the bore has a convex face 40, the object of which will hereinafter appear. The member 38 is split, as indicated at 41, and is provided with corresponding arms 42. A bolt 43 is rotatably secured in one of the arms by a pin 44 and threaded into the other arm, as at 45, so that by turning the bolt 43 the arms may be moved relative to one another to contract or expand the clamp.

That portion of the arbor at the left of the shoulder 17 need be nothing more than a hollow shell, as far as its being able to hold the work against rotative and axial movement is concerned, that is to say, the rigid shaft portion 18 in the work supporting portion of the arbor could be dispensed with, and the work would still be held against this type of movement. However, one of the advantages of the construction shown in the drawings and hereinbefore described is that the flexible wall 26 is so closely supported by the shoulders 27 and 28 and the body 18 of the shaft, that no wobble is permitted to the flexible shell, and the work positioned on the arbor against the shoulder 17 is thus rigidly held against radial movement during rotation about its center.

Figure 3:
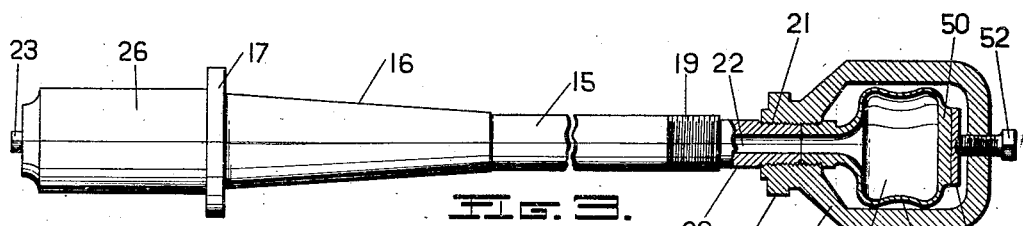
Fig. 3 is a modified form of the arbor.
Figure 4:
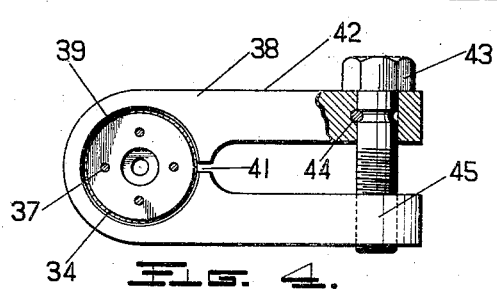
Fig. 4 is a cross sectional view on line 4—4, Fig. 1, illustrating the compression member.

A modified form of the invention is illustrated in Fig. 3. In this modified form a sleeve 46 supporting a yoke 47 is positioned on the threaded portion 21 and a bellows 48 having a flexible wall 49 is threaded in the sleeve 46, the bellows communicating with the axial bore 22 in the shaft 15. The bellows has a substantially thick end wall 50, and a compression plate 51 is positioned on the wall, and the plate is provided with a depression adapted to receive the end of a screw or bolt 52 mounted in the yoke.

In operation the plug 23 is removed, and the pressure on the wall of the chamber 36 released. The arbor is then filled with a suitable fluid, after which the plug is replaced. A work piece is then positioned on the sleeve 26 and pressure applied on the wall of the chamber 36 by means of the bolt 43 and the clamp actuated thereby. Upon applying pressure, bolt 43 is screwed down to force the convex face 40 on the member 38 against the wall 34 of the chamber 36, whereupon the wall is flexed inwardly to compress the fluid therein causing an expansion of the wall of the sleeve 26 which effectually binds the work piece to prevent slipping thereof when operated upon. In the modification, pressure is applied to the wall of the chamber 48 by the set screw 52 threaded in the yoke supporting the chamber.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of my invention, what I claim and desire to secure by Letters Patent is:

1. An arbor comprising interconnected chambers adapted to be filled with fluid and means for compressing one of the chambers to expand the other.

2. An arbor comprising an expansible member, a compressible member connected thereto and hydraulic means expanding the expansible member as the compressible member is compressed.

3. An arbor comprising a hollow shaft, a compressible chamber on one end of the shaft, an expansible member on the other end of the shaft and hydraulic means for expanding the expansible member as the compressible member is compressed.

4. An arbor comprising a shaft, a closed flexible sleeve on one end of the shaft providing an expansible chamber, a compressible chamber on the other end of the shaft, hydraulic means connecting the chambers, and means for compressing the compressible chamber thereby to expand the expansible chamber.

5. An arbor comprising a bored shaft, an expansible closed sleeve on one end of the shaft forming an expansible chamber communicating with the bore in the shaft, a compressible chamber on the other end of the shaft communicating with the bore in the shaft, and hydraulic means for expanding the expansible chamber upon compression of the compressible chamber.

6. A work supporting arbor comprising a shaft, a closed expansible sleeve supported at its ends on the shaft, means for preventing movement of the sleeve on the shaft, and duct means leading to the expansible sleeve so that hydraulic pressure may be transmitted through the shaft to expand the sleeve.

7. A work supporting arbor comprising a shaft, a closed cylindrical chamber supported at one end of the shaft against movement with respect thereto, said shaft supporting at its other end a compressible chamber, and hydraulic means for expanding the first chamber upon compression of the second.

8. In a device for holding work, an expansible and contractable member adapted to engage the work, an expansible and contractable control member, and a fluid transfer means connecting said members, the contraction of the control member creating pressure on the fluid to expand the work engaging member.

In testimony whereof I affix my signature.

JOHN M. CHRISTMAN.